(12) United States Patent
Benson et al.

(10) Patent No.: US 6,567,879 B1
(45) Date of Patent: May 20, 2003

(54) MANAGEMENT OF RESETS FOR INTERDEPENDENT DUAL SMALL COMPUTER STANDARD INTERFACE (SCSI) BUS CONTROLLER

(75) Inventors: Anthony Joseph Benson, Roseville, CA (US); James Lawrence White, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 520 days.

(21) Appl. No.: 09/605,161

(22) Filed: Jun. 27, 2000

(51) Int. Cl.[7] .............................................. G06F 13/00
(52) U.S. Cl. ..................................... 710/305; 710/314
(58) Field of Search .............................. 710/306, 305, 710/314, 107, 302; 714/14; 711/114

(56) References Cited

U.S. PATENT DOCUMENTS 5,978,877 A * 11/1999 Strevey ...................... 710/314
6,055,582 A * 4/2000 Pascarella et al. .......... 710/314
6,408,343 B1 * 6/2002 Erickson et al. .............. 710/15
6,430,686 B1 * 8/2002 Cargemel et al. .............. 713/1

* cited by examiner

*Primary Examiner*—Glenn A. Auve (57) ABSTRACT

A device includes a first SCSI bus, a second SCSI bus, a first bus controller slot, a second bus controller slot and a bus controller in one of the first bus controller slot and the second bus controller slot. The bus controller includes reset circuitry for generating a SCSI bus reset signal. The SCSI bus reset signal being used to reset the first SCSI bus when the bus controller is in the first bus controller slot and the first SCSI bus is isolated from the second SCSI bus. The SCSI bus reset signal being used to reset the second SCSI bus when the bus controller is in the second bus controller slot and the first SCSI bus is isolated from the second SCSI bus. The SCSI bus reset signal is to reset both the first SCSI bus and the second SCSI bus when the first SCSI bus and the second SCSI bus are bridged and one of the following conditions is met: the bus controller is in the first bus controller slot, or the bus controller is in the second bus controller slot and the first bus controller slot is empty.

14 Claims, 5 Drawing Sheets

MANAGEMENT OF RESETS FOR INTERDEPENDENT DUAL SMALL COMPUTER STANDARD INTERFACE (SCSI) BUS CONTROLLER

BACKGROUND

The present invention concerns communication between devices within a computing system and pertains particularly to management of resets for power failure and to hot swap devices connected through Small Computer Standard Interface (SCSI) buses to a dual SCSI bus controller.

In one category of network architectures, network devices are connected to a common communication bus. When one of the network devices desires to initiate a transfer of data over the bus, the network device will attempt to gain control of the bus. Once the network device has control of the bus, the transfer of data may be performed.

For example, the Small Computer Standard Interface (SCSI) is an input/output (I/O) interface connection used for personal computers. SCSI was originated as a disk memory interface and became a universal high speed I/O protocol. In communication bus systems which operate in accordance with the SCSI protocol, SCSI devices connected to a communication bus have a fixed network access priority. In the SCSI bus protocol, contention resolution is accomplished by granting bus control to the SCSI device which has the highest network access priority among the SCSI devices which, during an arbitration time period, request control of the communication bus.

Hardware implementation of a communication bus which uses the SCSI protocol is generally done using a 50 conductor flat ribbon or round bundle cable of characteristic impedance of 100 ohm. The nominal distance is six meters in single ended mode and 25 meters in differential mode. For more information on the SCSI protocol, see the American National Standard for SCSI-2, available as Document X3.131-199X from Global Engineering Documents, 2805 McGaw, Irvine, Calif. 92714.

It is necessary to perform a reset of a SCSI bus upon start-up, after a power failure, to remove devices from the SCSI bus and to add devices from the SCSI bus. However, when there are multiple controllers for a single SCSI bus, this requires coordination to determine which controller will oversee the SCSI bus reset.

SUMMARY OF THE INVENTION

In accordance with the preferred embodiment of the present invention, a device includes a first SCSI bus, a second SCSI bus, a first bus controller slot, a second bus controller slot and a bus controller in one of the first bus controller slot and the second bus controller slot. The bus controller includes reset circuitry for generating a SCSI bus reset signal. The SCSI bus reset signal being used to reset the first SCSI bus when the bus controller is in the first bus controller slot and the first SCSI bus is isolated from the second SCSI bus. The SCSI bus reset signal being used to reset the second SCSI bus when the bus controller is in the second bus controller slot and the first SCSI bus is isolated from the second SCSI bus. The SCSI bus reset signal is used to reset both the first SCSI bus and the second SCSI bus when the first SCSI bus and the second SCSI bus are bridged and one of the following conditions is met: the bus controller is in the first bus controller slot, or the bus controller is in the second bus controller slot and the first bus controller slot is empty.

For example, the device is a just a bunch of disks (JBOD) storage device. In the preferred embodiment, a first backplane connector connects the bus controller to the first SCSI bus. A second backplane connector connects the bus controller to the second SCSI bus. An isolator circuit is capable of electrically isolating the first backplane connector from the second backplane connector and is capable for connecting the first backplane connector to the second backplane connector. When the isolator circuit connects the first backplane connector to the second backplane connector this bridges the first SCSI bus and the second SCSI bus. When the bus controller is in the second bus controller slot and another bus controller is in the first bus controller, the second backplane connector isolator circuit isolates the first backplane connector from the second backplane connector. Additionally in the preferred embodiment, a first frontplane connector allows connection of the bus controller to a first host. A second frontplane connector allows connection of the bus controller to a second host.

The present invention provides for efficient reset of SCSI buses for power failure and for hot swapping of devices on SCSI networks.

DESCRIPTION OF THE PREFERRED EMBODIMENT

Figure 1:
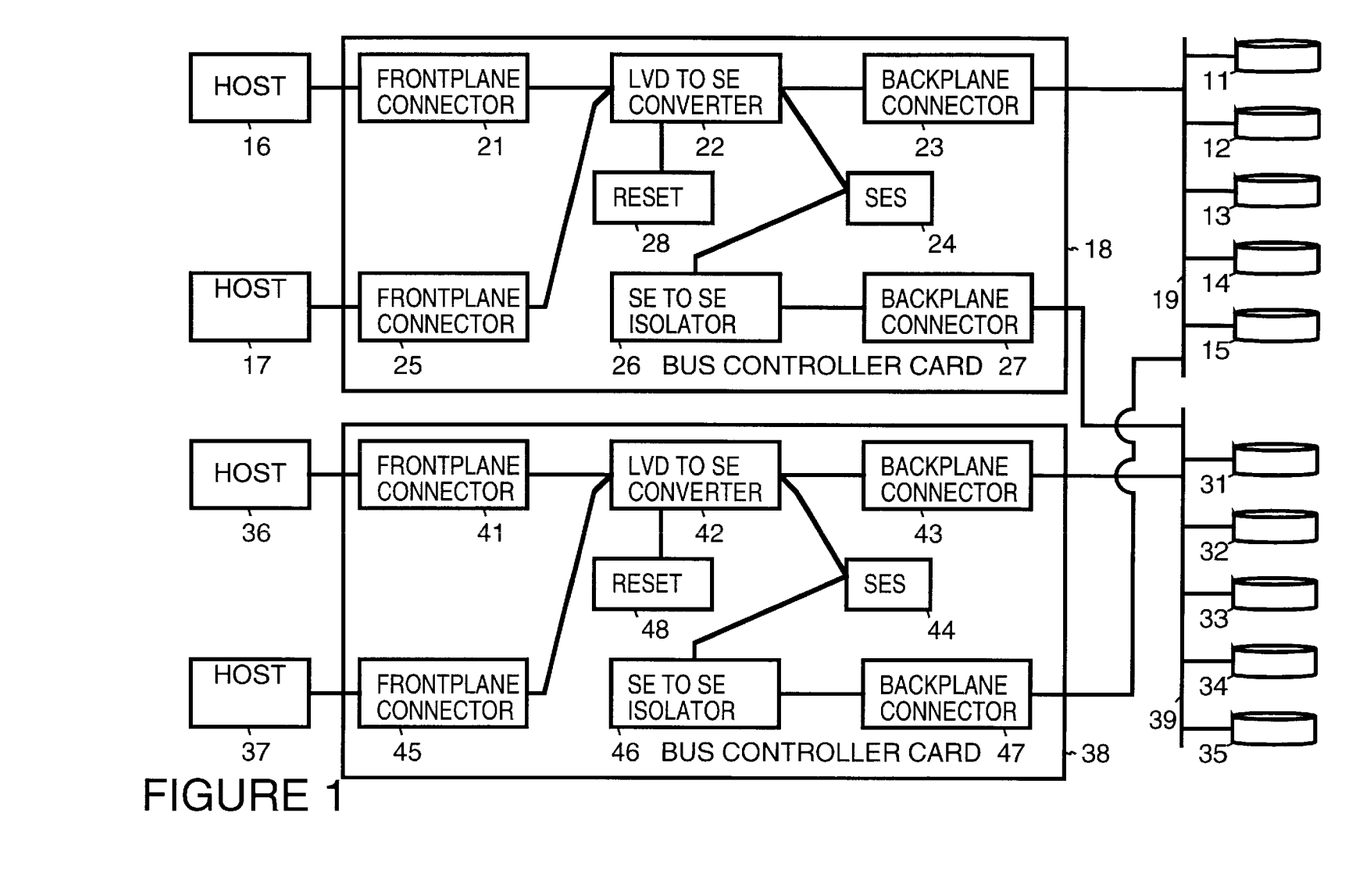
FIG. 1 is a simplified block diagram showing two bus controller cards used to control ten SCSI disk drives connected on two individual SCSI busses in accordance with a preferred embodiment of the present invention.

FIG. 1 is a simplified block diagram of a Just a Bunch of Disks (JBOD) enclosure that houses up to ten SCSI disk drives on two individual SCSI buses with five disk slots apiece. For example, to an even SCSI bus 19 is connected a disk drive 11, a disk drive 12, a disk drive 13, a disk drive 14 and a disk drive 15. A disk drive 31, a disk drive 32, a disk drive 33, a disk drive 34 and a disk drive 35 are connected to an odd SCSI bus 39.

A bus controller card (BCC) 18 in a slot A of the JBOD enclosure is connected to even SCSI bus 19 through a backplane connector 23. Bus controller 18 is connected to odd SCSI bus 39 through a backplane connector 27. Bus controller card 18 through a frontplane connector 21 interfaces with a host 16 (external to the JBOD enclosure). Bus controller card 18 through a frontplane connector 17 interfaces with a host 17 (external to the JBOD enclosure). Host 16 and host 17 are connected to bus controller card 18 in SCSI differential mode. A voltage differential mode to single ended mode (LVD to SE) converter 22 is used to convert SCSI signals from differential mode to single ended mode. A single ended node SCSI Enclosure Services (SES) chip 24 stubs off of the bus between LVD to SE converter 22 and a single ended to single ended (SE to SE) isolator 26. SES 24 and SE to SE isolator 26 allow bus controller card 18 to be configured to access odd SCSI bus 39 and thus access all disk drives on both busses. This allows greater flexibility in configuring the JBOD enclosure, allows hot swapping of failing cards and allows a single card solution for a bridged SCSI Bus implementation. Reset circuitry 28 is used by BCC 18 to generate SCSI bus resets.

A bus controller card (BCC) 38 in a slot B of the JBOD enclosure is connected to odd SCSI bus 39 through a backplane connector 43. Bus controller 38 is connected to even SCSI bus 19 through a backplane connector 47. Bus controller card 38 through a frontplane connector 41 interfaces with a host 36 (external to the JBOD enclosure). Bus controller card 38 through a frontplane connector 37 interfaces with a host 37 (external to the JBOD enclosure). Host 36 and host 37 are connected to bus controller card 38 in SCSI differential mode. A voltage differential mode to single ended mode (LVD to SE) converter 42 is used to convert SCSI signals from differential mode to single ended mode. A single ended node SCSI Enclosure Services (SES) chip 44 stubs off of the bus between LVD to SE converter 42 and a single ended to single ended (SE to SE) isolator 46. SES 44 and SE to SE isolator 46 allow bus controller card 38 to be configured to access even SCSI bus 19 and thus access all disk drives on both busses. However, in the preferred embodiment, in full bus mode SE to SE isolator 26 provides connection (bridging) between even SCSI bus 19 and odd SCSI bus 39 and isolator 46 is disabled. In split bus mode both SE to SE isolator 26 and SE to SE isolator 46 are disabled. Reset circuitry 48 is used by BCC 38 to generate SCSI bus resets.

In order to avoid data corruption, even SCSI bus 19 and odd SCSI bus 39 are reset by the JBOD enclosure in two instances, provided the pertinent circuitry is enabled. The first instance in which even SCSI bus 19 and odd SCSI bus 39 are reset by the JBOD enclosure is whenever a disk drive is inserted or removed from even SCSI bus 19 or odd SCSI bus 39. The second instance in which even SCSI bus 19 and odd SCSI bus 39 are reset by the JBOD enclosure is whenever AC Power is removed from the JBOD enclosure.

Enabling the resets allows the JBOD enclosure to operate independently. Disabling the resets allows the JBOD enclosure to operate behind an array controller.

Reset circuitry that controls SCSI bus resets for all the disk drives must take into account that there are two bus controller cards. Also the reset circuitry must take into account the configuration of bus controller card 18 and bus controller card 38 as to whether each BCC is in bridged or split bus mode. The reset circuitry must allow control to be passed from one BCC to the other when a BCC is inserted or removed from the JBOD enclosure. Also, the hot swap and AC power fail conditions drive the Reset circuit separately.

Table 1 below illustrates how bus controller card 18 (in slot A of the JBOD enclosure) and bus controller card 39 (in slot B of the JBOD enclosure) reset signals depending on bus configuration.

TABLE 1

| Configuration | Slot | Bus Reset |
|---|---|---|
| Split Bus (2 isolated SCSI Buses of 5 Disks apiece) | Slot A | Reset will reset Even SCSI Bus 19 |
| | Slot B | Reset will reset Odd SCSI Bus 39 |

TABLE 1-continued

| Configuration | Slot | Bus Reset |
|---|---|---|
| Full Bus (1 SCSI Bus of 10 Disks made of 2 5 disk SCSI buses bridged together) | Slot A | Reset will reset Odd and Even SCSI Buses since they are bridged. |
| | Slot B (With BCC in Slot A) | No SCSI Reset is driven by this card. The Reset is driven by the BCC in Slot A. |
| | Slot B (With no BCC in slot A) | Reset will reset Odd and Even SCSI Buses since they are bridged. |

Figure 2:
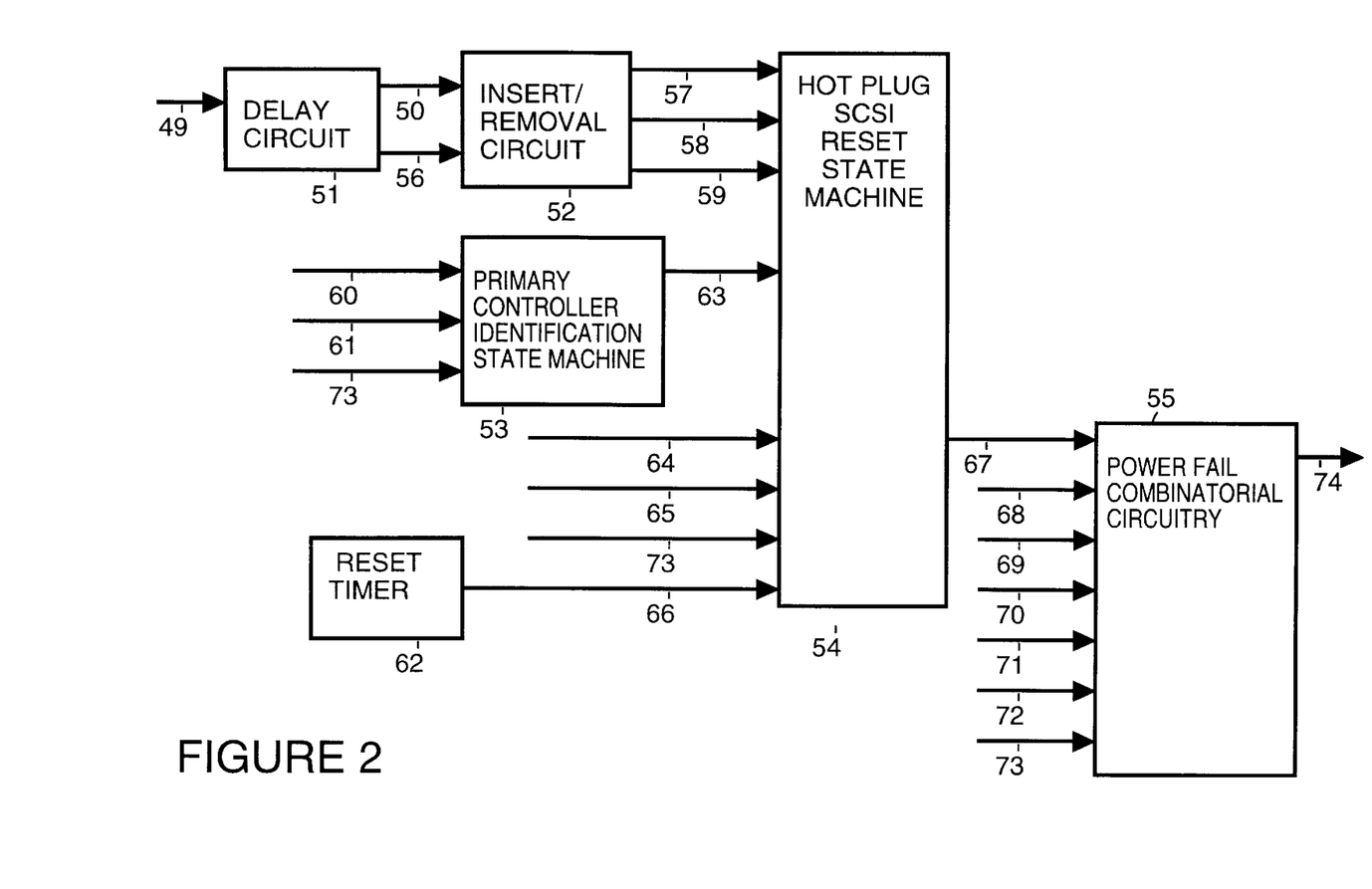
FIG. 2 shows high level logic flow used to generate a SCSI bus reset in accordance with a preferred embodiment of the present invention.

FIG. 2 shows high level logic flow for the reset circuitry within each BCC that is used to generate a SCSI bus reset in accordance with a preferred embodiment of the present invention. The reset circuitry includes a delay circuit 51, an insert/removal circuit 52, a primary controller identification state machine 53, a hot plug SCSI reset state machine 54 and power fail combinatorial circuitry 55 connected as shown.

Delay circuit 51 receives a ten bit mated 2 slot x signal 49 and produces a ten bit single clock delayed mated 2 slot x signal 50 and a ten bit double clock delayed mated 2 slot x signal 56. Insert removal circuit 52 receives ten bit single clock delayed mated 2 slot x signal 50 and ten bit double clock delayed mated 2 slot x signal 56 and produces an even SCSI Bus insert/removal signal 57, an odd SCSI bus insert/removal circuit signal 58 and an overall SCSI bus insert/removal signal 59.

Primary controller identification state machine 53 receives a card slot identifier signal 64, a card detection signal 65 and a state machine clock 73. Primary controller identification state machine 53 produces a primary controller signal 63.

Hot plug SCSI reset state machine 54 receives even SCSI Bus insert/removal signal 57, odd SCSI bus insert/removal circuit signal 58, overall SCSI bus insert/removal signal 59, primary controller signal 63, an enable SCSI bus bridge signal 64, a host swap SCSI bus reset enable 65 and state machine clock 73. Hot plug SCSI reset state machine 54 produces a hot swap SCSI bus reset signal 67.

Power fail combinatorial circuitry 55 receives hot swap SCSI bus reset signal 67, a power failure SCSI bus reset enable signal 68, a power supply A valid signal 69, a power supply B valid signal 70, a power supply A fault signal 71, a power supply B fault signal 72 and state machine clock 73. Power fail combinatorial circuitry 55 produces a (Not) SCSI bus reset signal 74.

Table 2 below gives signal definitions for each of the signals shown in FIG. 2.

TABLE 2

| Signal | Signal Description |
|---|---|
| Mated 2 Slot X signal 49 | Represents a series of Mated 2 signals (a signal for each disk drive) that come directly from the disk drives and indicate the presence of a disk drive in the slot. |
| Single Clock Delayed Mated 2 Slot X signal 50 | Mated 2 Slot X signal 49 delayed by one clock cycle. |
| Double Clock Delayed Mated 2 Slot X signal 56 | Mated 2 Slot X signal 49 delayed by two clock cycles. |
| Even SCSI Bus | Indicates there was a disk drive |

TABLE 2-continued

| Signal | Signal Description |
| --- | --- |
| Insertion/Removal signal 57 | inserted or removed on even SCSI Bus 19. |
| Odd SCSI Bus Insertion/Removal signal 58 | Indicates there was a disk drive inserted or removed on the odd SCSI Bus 39. |
| Overall SCSI Bus Insertion/Removal signal 59 | The result of performing a logic OR on Even SCSI Bus Insertion/Removal signal 57 and Odd SCSI Bus Insertion/Removal signal 58 and performing a logic AND of the result with a mask signal that filters the first two clock signals after a system reset. |
| Card Slot Identifier signal 60 | Indicates which slot the BCC resides in. |
| Card Detection Signal 61 | Indicates the presence of another BCC in the other slot. |
| Primary Controller signal 63 | Indicates whether the BCC is the primary controller. |
| Enable SCSI Bus Bridge signal 64 | Indicates if the BCC will support the SCSI Buses on the backplane being bridged together. Otherwise the SCSI Buses operate independently. |
| Hot Swap SCSI Bus Reset Enable signal 65 | Indicates if the SCSI Bus should be reset if a disk drive is inserted or removed from the SCSI Bus. |
| Hot Swap SCSI BUS Reset signal 67 | Intermediate SCSI Bus reset signal. |
| Power Fail SCSI Bus Reset Enable signal 68 | Indicates if the SCSI Bus should be reset if AC power is turned off. |
| Power Supply A Valid signal 69 | Asserted true when all voltages are valid. |
| Power Supply B Valid signal 70 | Asserted true when all voltages are valid. |
| Power Supply A Fault signal 71 | Issued by the power supply A when there is a failure such as over-temperature, over-voltage or over-current. |
| Power Supply B Fault signal 72 | Issued by the power supply B when there is a failure such as over-temperature, over-voltage or over-current. |
| State Machine Clock 73 | Clocks the state machines. |
| !SCSI Bus Reset signal 74 | Drives the SCSI Bus Reset signal. |

Figure 3:
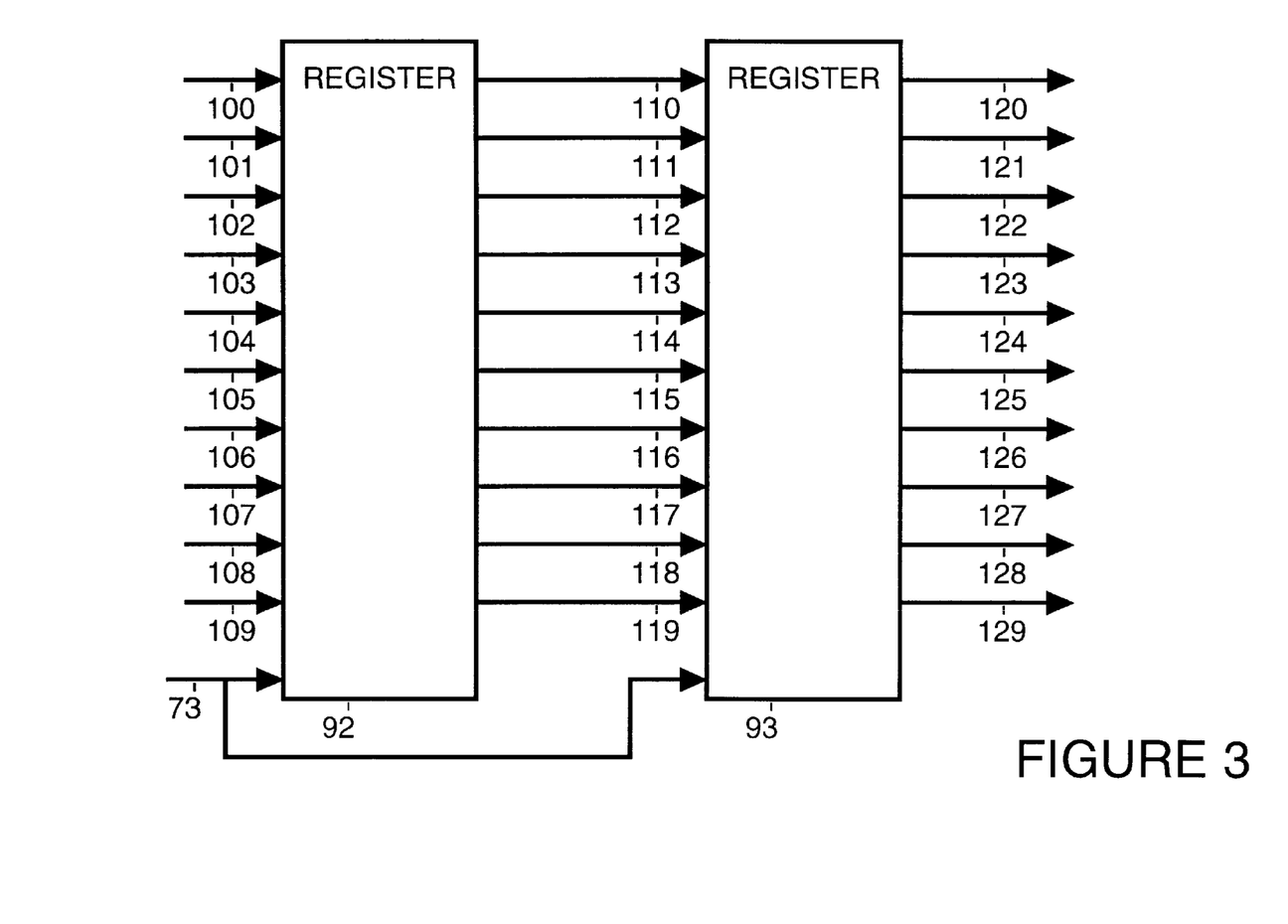
FIG. 3 shows logic used to implement a delay circuit in accordance with a preferred embodiment of the present invention.

FIG. 3 shows logic used to implement a delay circuit 51 shown in FIG. 2. Ten bit mated 2 slot x signal 49 is shown to include a mated 2 slot 0 signal 100, a mated 2 slot 1 signal 101, a mated 2 slot 2 signal 102, a mated 2 slot 3 signal 103, a mated 2 slot 4 signal 104, a mated 2 slot 5 signal 105, a mated 2 slot 6 signal 106, a mated 2 slot 7 signal 107, a mated 2 slot 8 signal 108 and a mated 2 slot 9 signal 109.

Single Clock Delayed Mated 2 Slot X signal 50 is shown to include a double clock delayed mated 2 slot 0 signal 120, a double clock delayed mated 2 slot 1 signal 121, a double clock delayed mated 2 slot 2 signal 122, a double clock delayed mated 2 slot 3 signal 123, a double clock delayed mated 2 slot 4 signal 124, a double clock delayed mated 2 slot 5 signal 125, a double clock delayed mated 2 slot 6 signal 126, a double clock delayed mated 2 slot 7 signal 127, a double clock delayed mated 2 slot 8 signal 128 and a double clock delayed mated 2 slot 9 signal 129.

Double Clock Delayed Mated 2 Slot X signal 56 is shown to include a single clock delayed mated 2 slot 0 signal 110, a single clock delayed mated 2 slot 1 signal 111, a single clock delayed mated 2 slot 2 signal 112, a single clock delayed mated 2 slot 3 signal 113, a single clock delayed mated 2 slot 4 signal 114, a single clock delayed mated 2 slot 5 signal 115, a single clock delayed mated 2 slot 6 signal 116, a single clock delayed mated 2 slot 7 signal 117, a single clock delayed mated 2 slot 8 signal 118 and a single clock delayed mated 2 slot 9 signal 119.

A register 92 receives mated 2 slot 0 signal 100, mated 2 slot 1 signal 101, mated 2 slot 2 signal 102, mated 2 slot 3 signal 103, mated 2 slot 4 signal 104, mated 2 slot 5 signal 105, mated 2 slot 6 signal 106, mated 2 slot 7 signal 107, mated 2 slot 8 signal 108, mated 2 slot 9 signal 109 and state machine clock 73 and produces single clock delayed mated 2 slot 0 signal 110, single clock delayed mated 2 slot 1 signal 111, single clock delayed mated 2 slot 2 signal 112, single clock delayed mated 2 slot 3 signal 113, single clock delayed mated 2 slot 4 signal 114, single clock delayed mated 2 slot 5 signal 115, single clock delayed mated 2 slot 6 signal 116, single clock delayed mated 2 slot 7 signal 117, single clock delayed mated 2 slot 8 signal 118 and single clock delayed mated 2 slot 9 signal 119.

A register 93 receives single clock delayed mated 2 slot 0 signal 110, single clock delayed mated 2 slot 1 signal 111, single clock delayed mated 2 slot 2 signal 112, single clock delayed mated 2 slot 3 signal 113, single clock delayed mated 2 slot 4 signal 114, single clock delayed mated 2 slot 5 signal 115, single clock delayed mated 2 slot 6 signal 116, single clock delayed mated 2 slot 7 signal 117, single clock delayed mated 2 slot 8 signal 118, single clock delayed mated 2 slot 9 signal 119. and state machine clock 73 and produces double clock delayed mated 2 slot 0 signal 120, double clock delayed mated 2 slot 1 signal 121, double clock delayed mated 2 slot 2 signal 122, double clock delayed mated 2 slot 3 signal 123, double clock delayed mated 2 slot 4 signal 124, double clock delayed mated 2 slot 5 signal 125, double clock delayed mated 2 slot 6 signal 12 6, double clock delayed mated 2 slot 7 signal 127, double clock delayed mated 2 slot 8 signal 128 and double clock delayed mated 2 slot 9 signal 129.

Figure 4:
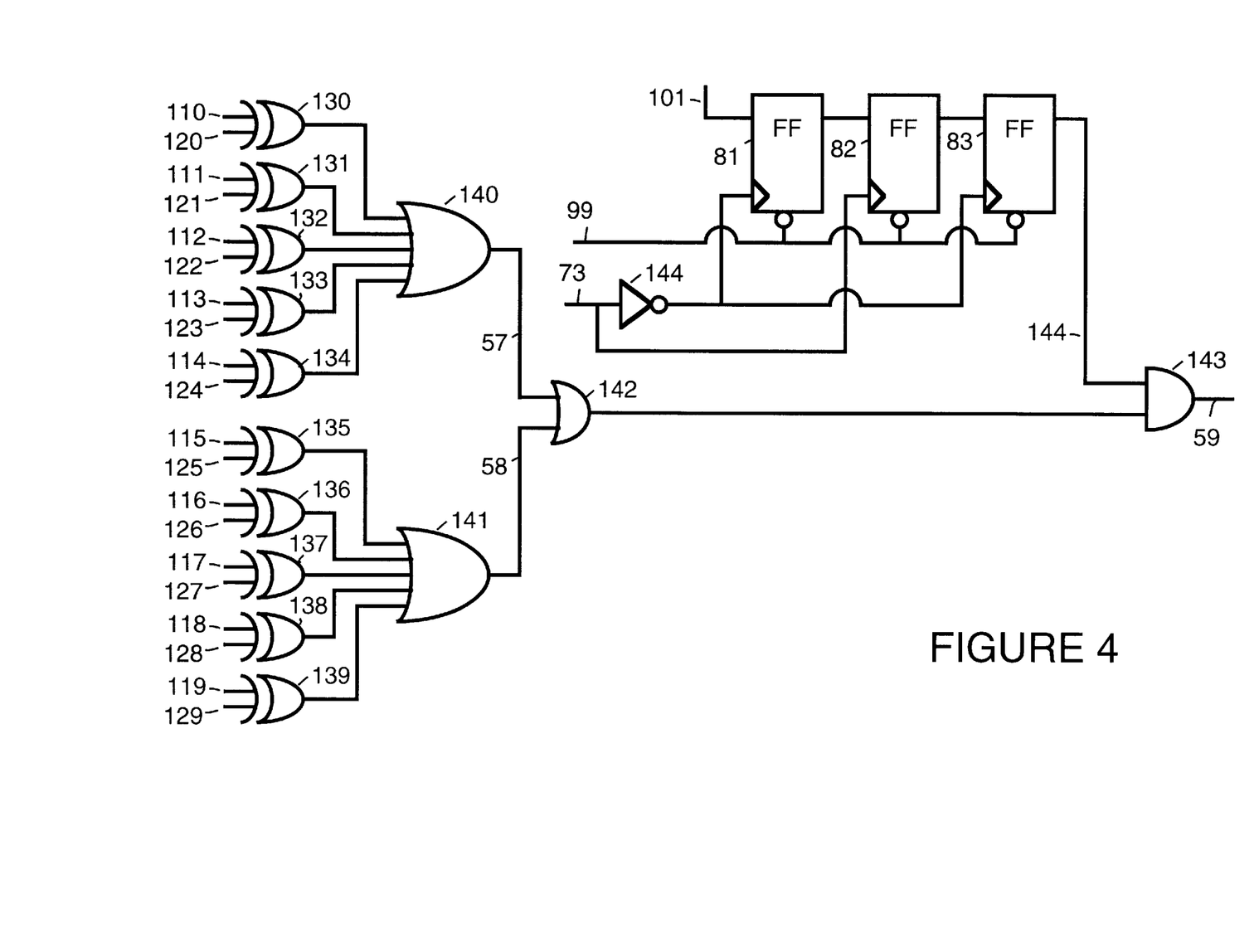
FIG. 4 shows logic used to generate an overall SCSI bus insert/removal signal in accordance with a preferred embodiment of the present invention.

FIG. 4 shows logic used to implement insert/removal circuit 52. A logic XOR gate 130 performs a logic XOR operation on single clock delayed mated 2 slot 0 signal 110 and double clock delayed mated 2 slot 0 signal 120. A logic XOR gate 131 performs a logic XOR operation on single clock delayed mated 2 slot 0 signal 111 and double clock delayed mated 2 slot 0 signal 121. A logic XOR gate 132 performs a logic XOR operation on single clock delayed mated 2 slot 0 signal 112 and double clock delayed mated 2 slot 0 signal 122. A logic XOR gate 133 performs a logic XOR operation on single clock delayed mated 2 slot 0 signal 113 and double clock delayed mated 2 slot 0 signal 123. A logic XOR gate 134 performs a logic XOR operation on single clock delayed mated 2 slot 0 signal 114 and double clock delayed mated 2 slot 0 signal 124.

A logic OR gate 140 performs a logic OR on the output of logic XOR gate 130, logic XOR gate 131, logic XOR gate 132, logic XOR gate 133, logic XOR gate 134 to produce even SCSI Bus insert/removal signal 57.

A logic XOR gate 135 performs a logic XOR operation on single clock delayed mated 2 slot 0 signal 115 and double clock delayed mated 2 slot 0 signal 125. A logic XOR gate 136 performs a logic XOR operation on single clock delayed mated 2 slot 0 signal 116 and double clock delayed mated 2 slot 0 signal 126. A logic XOR gate 137 performs a logic XOR operation on single clock delayed mated 2 slot 0 signal 117 and double clock delayed mated 2 slot 0 signal 127. A logic XOR gate 138 performs a logic XOR operation on single clock delayed mated 2 slot 0 signal 118 and double clock delayed mated 2 slot 0 signal 128. A logic XOR gate 139 performs a logic XOR operation on single clock delayed mated 2 slot 0 signal 119 and double clock delayed mated 2 slot 0 signal 129.

A logic OR gate 141 performs a logic OR on the output of logic XOR gate 135, logic XOR gate 136, logic XOR gate 137, logic XOR gate 138, logic XOR gate 139 to produce odd SCSI Bus insert/removal signal 58.

A logic OR gate 142 performs a logic OR on even SCSI Bus insert/removal signal 57 and odd SCSI Bus insert/removal signal 58. A logic AND gate 143 performs a logic AND on the output of logic OR gate 142 and a mask signal 144 to produce overall SCSI bus insert/removal signal 59. Mask signal 144 is used to mask overall SCSI bus insert/removal signal 59 in the clock cycles immediately filing a system reset.

Mask signal 144 is generated using a flip-flop (FF) 81, a flip-flop 82, a flip-flop 83 and a logic NOT gate 144 connected as shown. A VCC power signal 101 is placed on a input of flip-flop 81. A system reset 99 signal clears to zero the values stored by FF 81, FF 82 and FF 83. State machine clock 73 is used to clock FF 81, FF 82 and FF 83.

Figure 5:
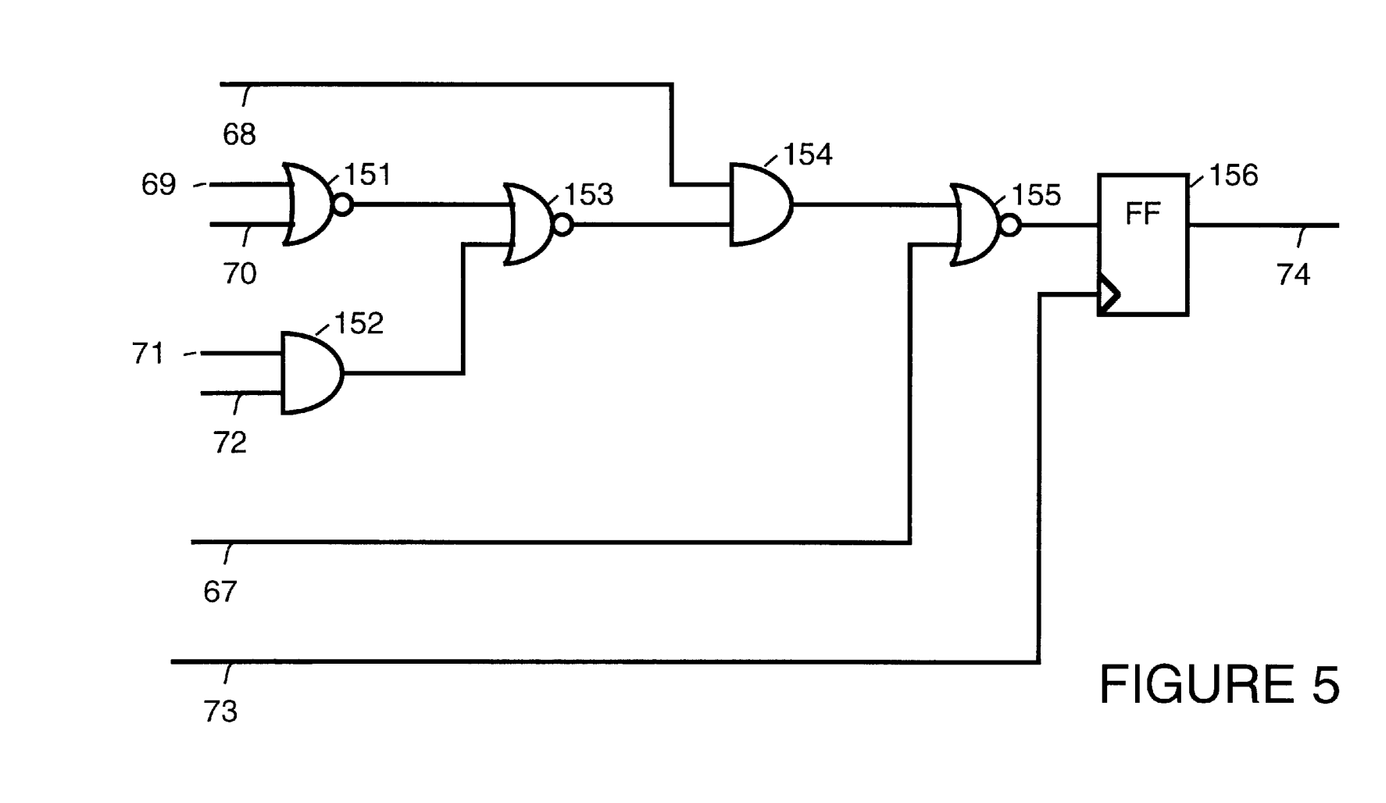
FIG. 5 shows logic used to generate a SCSI bus reset signal in accordance with a preferred embodiment of the present invention.

FIG. 5 shows logic used to implement power fail combinatorial circuitry 55. A logic NOR gate 151, a logic AND gate 152, a logic NOR gate 153, a logic AND gate 154, a logic NOR gate 155 and a flip-flop 156 are connected as shown in order to generate (Not) SCSI bus reset signal 74 from hot swap SCSI bus reset signal 67, a power failure SCSI bus reset enable signal 68, a power supply A valid signal 69, a power supply B valid signal 70, a power supply A fault signal 71, a power supply B fault signal 72 and state machine clock 73.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A device comprising:
    a first SCSI bus;
    a second SCSI bus;
    a first bus controller slot;
    a second bus controller slot; and,
    a bus controller in one of the first bus controller slot and the second bus controller slot, the bus controller comprising:
        reset circuitry for generating a SCSI bus reset signal, the SCSI bus reset signal being used to reset:
            the first SCSI bus when the bus controller is in the first bus controller slot and the first SCSI bus is isolated from the second SCSI bus,
            the second SCSI bus when the bus controller is in the second bus controller slot and the first SCSI bus is isolated from the second SCSI bus, and
            both the first SCSI bus and the second SCSI bus when the first SCSI bus and the second SCSI bus are bridged and one of the following conditions is met:
                the bus controller is in the first bus controller slot,
                the bus controller is in the second bus controller slot and the first bus controller slot is empty.

2. A device as in claim 1 wherein the bus controller additionally comprises:
    a first backplane connector that connects the bus controller to the first SCSI bus; and,
    a second backplane connector that connects the bus controller to the second SCSI bus.

3. A device as in claim 1 wherein the bus controller additionally comprises:
    a first backplane connector that connects the bus controller to the first SCSI bus;
    a second backplane connector that connects the bus controller to the second SCSI bus; and,
    an isolator circuit that is capable of electrically isolating the first backplane connector from the second backplane connector and is capable for connecting the first backplane connector to the second backplane connector;
    wherein when the isolator circuit connects the first backplane connector to the second backplane connector this bridges the first SCSI bus and the second SCSI bus.

4. A device as in claim 1 wherein the bus controller additionally comprises:
    a first backplane connector that connects the bus controller to the first SCSI bus;
    a second backplane connector that connects the bus controller to the second SCSI bus; and,
    an isolator circuit that is capable of electrically isolating the first backplane connector from the second backplane connector and is capable for connecting the first backplane connector to the second backplane connector;
    wherein when the isolator circuit connects the first backplane connector to the second backplane connector this bridges the first SCSI bus and the second SCSI bus; and,
    wherein when the bus controller is in the second bus controller slot and another bus controller is in the first bus controller, the second backplane connector isolator circuit isolates the first backplane connector from the second backplane connector.

5. A device as in claim 1 wherein the bus controller additionally comprises:
    a first frontplane connector that allows connection of the bus controller to a first host; and,
    a second frontplane connector that allows connection of the bus controller to a second host.

6. A device as in claim 1 wherein the device is a just a bunch of disks (JBOD) storage device.

7. A bus controller for placement in one of a first bus controller slot and a second bus controller slot of a device that includes a first SCSI bus and a second SCSI bus, the bus controller comprising:
    reset circuitry for generating a SCSI bus reset signal, the SCSI bus reset signal being used to reset:
        the first SCSI bus when the bus controller is in the first bus controller slot and the first SCSI bus is isolated from the second SCSI bus,
        the second SCSI bus when the bus controller is in the second bus controller slot and the first SCSI bus is isolated from the second SCSI bus, and,
        both the first SCSI bus and the second SCSI bus when the first SCSI bus and the second SCSI bus are bridged and one of the following conditions is met:
            the bus controller is in the first bus controller slot,
            the bus controller is in the second bus controller slot and the first bus controller slot is empty.

8. A bus controller as in claim 7 additionally comprising:
    a first backplane connector that connects the bus controller to the first SCSI bus; and, a second backplane connector that connects the bus controller to the second SCSI bus.

9. A bus controller as in claim 7 additionally comprising:

a first backplane connector that connects the bus controller to the first SCSI bus;

a second backplane connector that connects the bus controller to the second SCSI bus; and, an isolator circuit that is capable of electrically isolating the first backplane connector from the second backplane connector and is capable for connecting the first backplane connector to the second backplane connector;

wherein when the isolator circuit connects the first backplane connector to the second backplane connector this bridges the first SCSI bus and the second SCSI bus.

10. A bus controller as in claim 7 additionally comprising:

a first backplane connector that connects the bus controller to the first SCSI bus;

a second backplane connector that connects the bus controller to the second SCSI bus; and, an isolator circuit that is capable of electrically isolating the first backplane connector from the second backplane connector and is capable for connecting the first backplane connector to the second backplane connector;

wherein when the isolator circuit connects the first backplane connector to the second backplane connector this bridges the first SCSI bus and the second SCSI bus; and, wherein when the bus controller is in the second bus controller slot and another bus controller is in the first bus controller, the second backplane connector isolator circuit isolates the first backplane connector from the second backplane connector.

11. A bus controller as in claim 7 additionally comprising:

a first frontplane connector that allows connection of the bus controller to a first host; and, a second frontplane connector that allows connection of the bus controller to a second host.

12. A bus controller as in claim 7 wherein the device is a just a bunch of disks (JBOD) storage device.

13. A method by which a bus controller within a device determines whether to generate SCSI bus reset upon power failure or upon hot swapping occurring on a first SCSI bus and a second SCSI bus, the method comprising the following steps:

(a) generating a SCSI bus reset signal for the first SCSI bus when the bus controller is in a first bus controller slot and the first SCSI bus is isolated from the second SCSI bus;

(b) generating a SCSI bus reset signal for the second SCSI bus when the bus controller is in a second bus controller slot and the first SCSI bus is isolated from the second SCSI bus; and, (c) generating a SCSI bus reset signal for both the first SCSI bus and the second SCSI bus when the first SCSI bus and the second SCSI bus are bridged and one of the following conditions is met:

the bus controller is in the first bus controller slot, the bus controller is in the second bus controller slot and the first bus controller slot is empty.

14. A method as in claim 13 wherein the device is a just a bunch of disks (JBOD) storage device.

* * * * *